(12) United States Patent
Engelhardt et al.

(10) Patent No.: US 7,009,785 B2
(45) Date of Patent: Mar. 7, 2006

(54) MICROSCOPE AND LOCKING DEVICE FOR A LENS MOUNTING

(75) Inventors: Johann Engelhardt, Bad Schoenborn (DE); Kyra Moellmann, Trippstadt (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/488,124

(22) PCT Filed: Aug. 28, 2002

(86) PCT No.: PCT/EP02/09588

§ 371 (c)(1),
(2), (4) Date: Feb. 27, 2004

(87) PCT Pub. No.: WO03/021328

PCT Pub. Date: Mar. 13, 2003

(65) Prior Publication Data

US 2004/0207937 A1   Oct. 21, 2004

(30) Foreign Application Priority Data

Aug. 29, 2001  (DE) ................................ 101 42 229

(51) Int. Cl.
*G02B 7/02* (2006.01)
(52) U.S. Cl. .................................................. 359/819
(58) Field of Classification Search ............... 359/819, 359/821, 702, 368, 379
See application file for complete search history.

(56) References Cited

U.S. PATENT DOCUMENTS

| | | | |
|---|---|---|---|
| 1,406,315 A | 2/1922 | Whittaker | |
| 2,616,475 A | 11/1952 | Koza | 151/24 |
| 3,981,562 A * | 9/1976 | Anthon | 359/559 |
| 4,126,392 A * | 11/1978 | House | 356/28.5 |
| 4,215,915 A * | 8/1980 | Freiberg | 359/506 |
| 4,328,713 A * | 5/1982 | Lund | 74/479.01 |
| 4,372,650 A * | 2/1983 | Lisfeld et al. | 359/829 |
| 5,528,879 A * | 6/1996 | Louy et al. | 53/201 |
| 5,581,415 A * | 12/1996 | de Graffenried | 359/819 |
| 5,684,624 A * | 11/1997 | Wieber et al. | 359/384 |
| 6,327,080 B1 * | 12/2001 | Brinkmann et al. | 359/381 |
| 6,328,269 B1 * | 12/2001 | Krautloher | 248/288.11 |
| 6,744,575 B1 * | 6/2004 | Andrews | 359/819 |
| 2003/0035229 A1 * | 2/2003 | Willis | 359/819 |

FOREIGN PATENT DOCUMENTS

| | | |
|---|---|---|
| DE | 916915 | 9/1954 |
| DE | 3923355 | 1/1991 |
| DE | 4323129 | 2/1994 |
| EP | 0407861 | 1/1991 |
| FR | 2819057 | 7/2002 |
| GB | 1139217 | 1/1969 |
| JP | 2000221408 | 8/2000 |
| WO | 8001512 | 7/1980 |

OTHER PUBLICATIONS

Patent Abstracts of Japan, vol. 2000, No. 11, Jan. 3, 2001 & JP 2000 221498 A, Olympus Optical Co. LTD, Aug. 11, 2000, paragraph 0010, one page.
International Search Report for PCT/EP02/09588, dated Nov. 28, 2002.

* cited by examiner

*Primary Examiner*—Ricky Mack
(74) *Attorney, Agent, or Firm*—Davidson, Davidson & Kappel, LLC

(57) ABSTRACT

A microscope includes a lens holder for receiving a lens. A locking device is provided that affixes the received lens so that the lens cannot be removed without authorization.

30 Claims, 4 Drawing Sheets

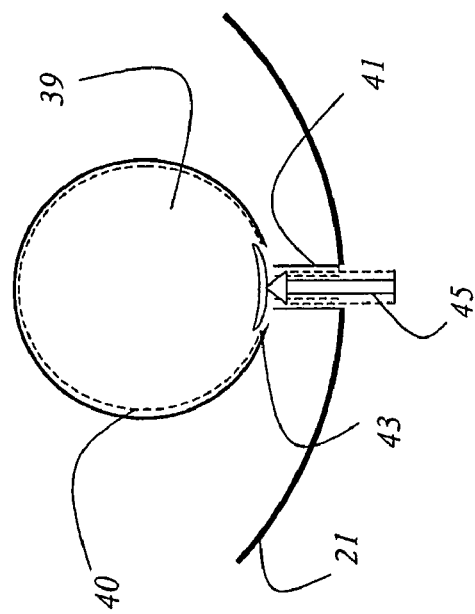
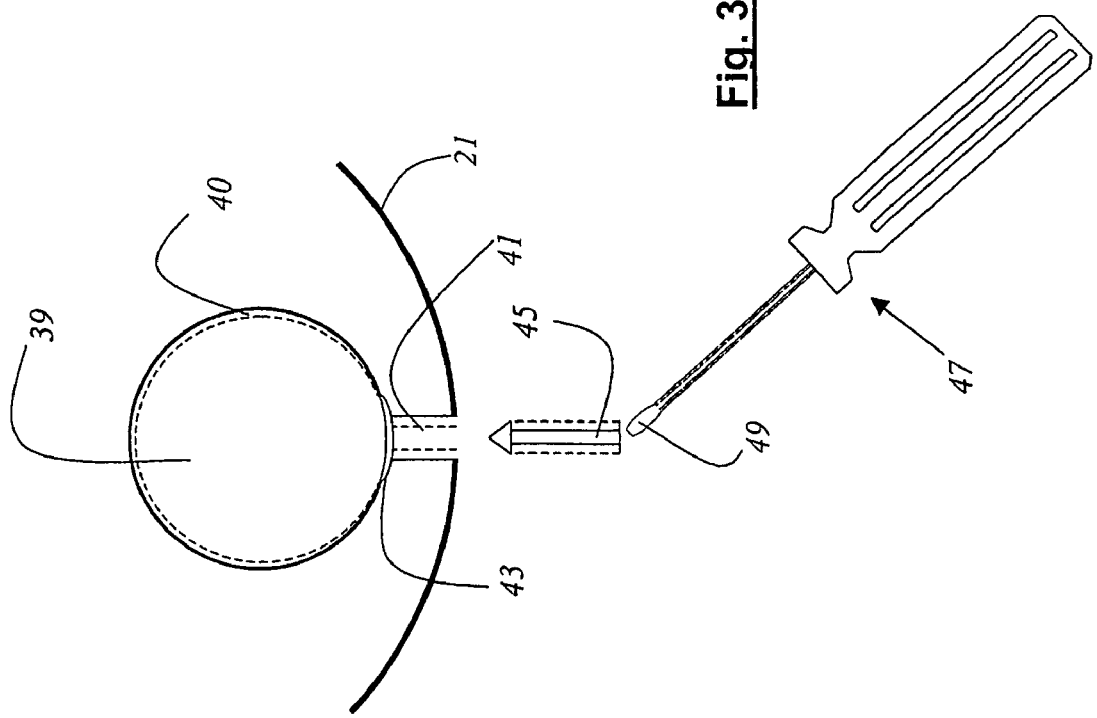

MICROSCOPE AND LOCKING DEVICE FOR A LENS MOUNTING

The invention relates to a microscope having a lens holder into which lenses can be inserted.

The invention also relates to a locking device for a lens holder into which the lenses can be inserted.

BACKGROUND

Most commercially available microscopes are designed in such a way that, depending on the requirements of the preparation to be examined, different lenses can be inserted into the optical path. For this purpose, there is a thread into which different lenses can be screwed. Microscopes often comprise means in which several lenses are screwed in or stored and which allow a simple insertion of the lenses into the optical path of the microscope. Devices of this type are usually configured as lens turrets.

Microscopes with lenses that can be screwed out and that are fitted with a laser such as, for instance, laser scanning microscopes or microscopes with a laser device for specimen manipulation entail the disadvantage that hazardous laser radiation might escape in an undesired and uncontrolled manner if the lens is inadvertently removed.

Microscopes with interchangeable lenses also have the drawback that the relatively small, although usually expensive, lenses can be easily removed or can be easily lost. This aspect is of particular relevance in the case of microscopes employed in schools.

Japanese patent JP 2000221408 A2 discloses a lens turret with a cylindrical protective ring that is affixed with screws and that encompasses all lenses, thus making unauthorized removal more difficult. The protective ring, however, greatly limits the space around the lenses, which has a very detrimental impact when it comes to bringing laboratory devices such as, for example, manipulators or micropipettes, close to the specimen. Besides, authorized replacement of the lenses can only be carried out with considerable effort, namely, by dismantling the specimen stage or the microscope stand.

SUMMARY OF THE INVENTION

Therefore, it is an object of the present invention to provide a microscope which largely prevents loss of the lenses and, if a laser is an integral part of the microscope, also prevents the uncontrolled release of laser radiation while still allowing full utilization of the microscope.

The the present invention provides a microscope including a lens holder for receiving a lens, and a locking device. The locking device affixes the received lens so that the lens cannot be removed without authorization.

Another objective of the invention is to provide a locking device for a lens holder which largely prevents the loss of the lenses while still allowing full utilization of the microscope.

The present invention also provides a locking device for a lens holder in which a lens can be received. The locking device includes an affixing device for affixing a lens received by the lens holder so that the lens cannot be removed without authorization.

The invention entails the advantage that it prevents the loss or theft of the lenses. Moreover, the invention has the advantage that it prevents the release of hazardous laser radiation from microscopes that are fitted with lasers.

In a preferred embodiment, the locking device affixes the inserted lenses in such a way that they can only be removed using a tool, the latter preferably being a special tool.

In another embodiment, the lens holder has a thread into which the lenses can be screwed, whereby the locking device prevents the screwed-in lens from turning inside the thread. The locking device comprises at least one screw, preferably a stud, which blocks the thread by a locking action.

In another embodiment, the locking device comprises a lock.

Another embodiment is characterized in that the locking device only allows the lens to be removed after executing a certain clockwise or counterclockwise turning combination by a predefined angle. For this purpose, there is preferably a catch mechanism into which the lens latches after it has been rotated by a definable angle.

In a very particularly preferred embodiment relating to microscopes having a light source, especially lasers, said light source can be automatically switched off, shielded, or blocked by removing the lens.

In another embodiment, electronic circuitry is provided that releases the locking device only after a secret code has been entered, for instance, via a keypad present on the device, via a remove control or via computer input. With this embodiment, instead of studs, electromagnetically sliding blocking pins are provided as part of the locking device.

In a preferred embodiment, a coin receptacle is provided that only releases the locking device once a deposit coin has been inserted; there is preferably a separate coin receptacle for each lens.

BRIEF DESCRIPTION OF THE DRAWINGS

The drawing schematically depicts the subject matter of the invention and will be described below with reference to the figures, whereby elements having the same function are designated with the same reference numerals. The following is shown:

FIG. 3a—a locking device according to the invention in the unlocked state;

FIG. 3b—a locking device according to the invention in the locked state; and

DETAILED DESCRIPTION

Figure 1:
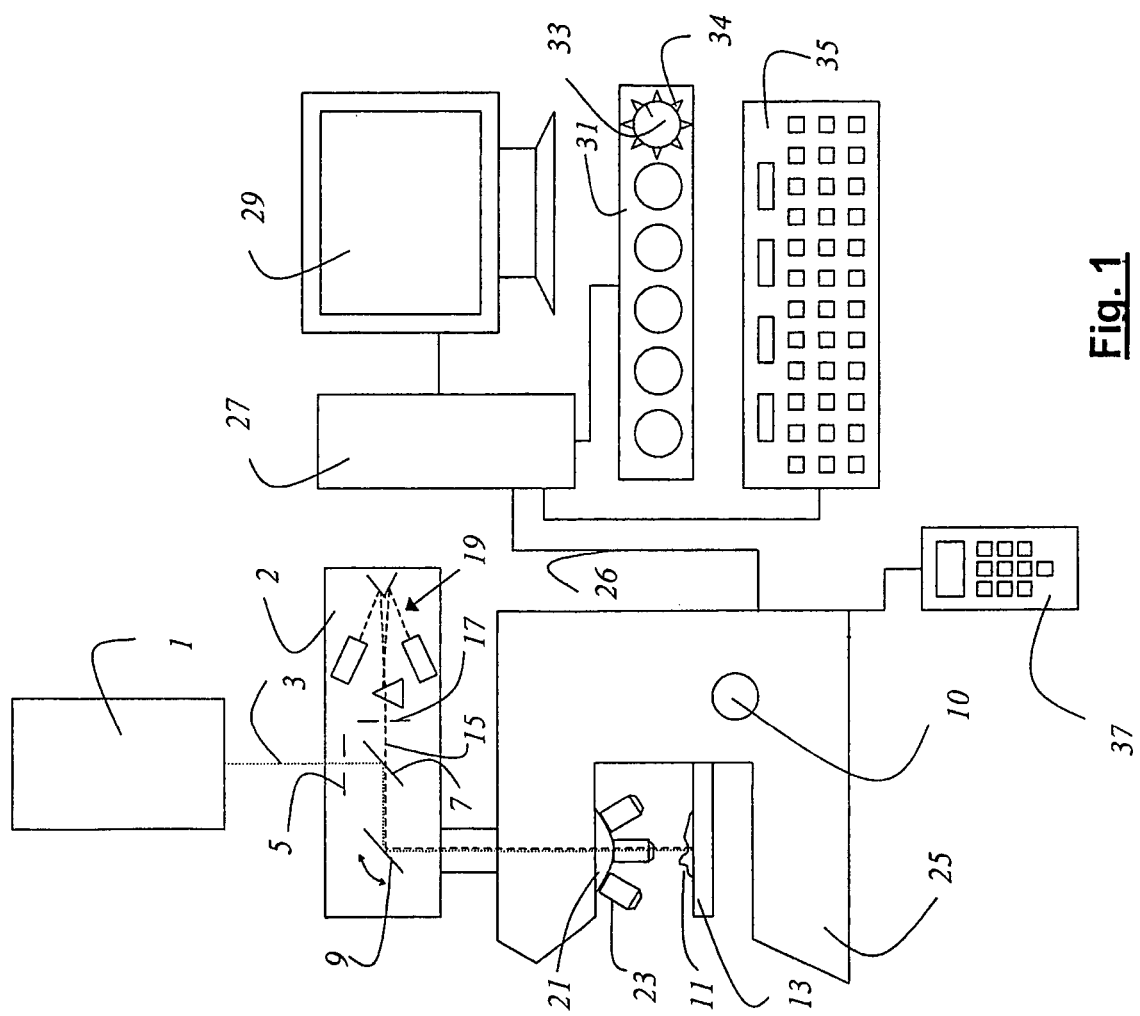
FIG. 1—a microscope according to the invention which is configured as a laser scanning microscope.

FIG. 1 shows a microscope according to the invention which is configured as a laser scanning microscope. The device is controlled by means of a PC 27. A monitor 29 that serves to display the image of the specimen 11 and to show the selected microscope parameters is connected to the PC 27. The system parameters are selected by means of the panel box 31 that has individually definable knobs 33 and by means of the keyboard 35. For focusing purposes, the specimen stage 13 on which the specimen 11 is positioned can be moved vertically by turning the adjusting knob 10. The specimen is essentially scanned with the scanner 2. A laser serves as the light source 1. The scanner 2 is flanged onto the microscope stand 25. The illumination light beam 3 coming from the light source 1 is reflected by a beam splitter 7 towards the gimbal-mounted scanning mirror 9 that guides the illumination light beam 3 through the lens 23 over or through the specimen 11. In the case of a non-transparent specimen 11, the illumination light beam 3 is guided over the surface of the object. With biological specimens 11 or with transparent specimens 11, the illumination light beam 3 can also be guided through the specimen 11. This means that several focal planes of the specimen 11 can be consecutively illuminated by the illumination light beam 3 and thus scanned. The subsequent composition then yields a three-dimensional image of the specimen 11. The illumination light beam 3 coming from the light source 1 is shown in the drawing as a dotted line. The detection light 15 emitted by the specimen 11 passes through the lens 23 and via the scanning mirror 9 to reach the beam splitter 7, it then passes through the latter and strikes the detector 19, which is configured as a multiband detector. The detection light 15 emitted by the specimen 11 is shown as a broken line. Electric detection signals that are proportional to the output of the illumination light 15 emitted by the specimen 11 are generated and further processed in the detector 19. For the sake of completeness, the illumination pinhole 5 commonly found in a confocal scanning microscope as well as the detection pinhole 17 have also been drawn in schematically. On the other hand, a few optical elements that serve to guide and shape the light beams have been omitted for the sake of clarity. These elements are quite familiar to the person skilled in the art. The lens turret 21 is configured in such a way that several lenses 23 can be screwed in at different affixed positions. After being screwed in, the lenses can be affixed in their holder by means of moveable magnetic pins. Each individual lens holder is provided with a special secret code that should only be known to the user. After the special secret code has been entered, the locking device is released and the user can remove from the lens turret 21 the lens 23 that she/he has specified. The device offers several different possibilities for entering the secret code. When an attempt is made to unscrew a certain lens 23 from its holder, a signal is sent to the PC 27 via the control line 26. Then, via the monitor 29, the PC 27 generates a prompt for the user to enter the special secret code for this holder. Only once the code has been entered via the keyboard 35 is it possible to remove the lens 23 from its holder. The secret code can also be entered directly by the user by means of the remote control 37. Another possibility consists of using the panel box 37 on which there is a knob 33 having a scale 34. After the prompt to enter the code has been generated on the monitor 29 by the computer 27, the user can release the locking device and subsequently remove the lens 23 after executing a certain clockwise and counterclockwise turning combination by predefined angular positions.

Figure 2:
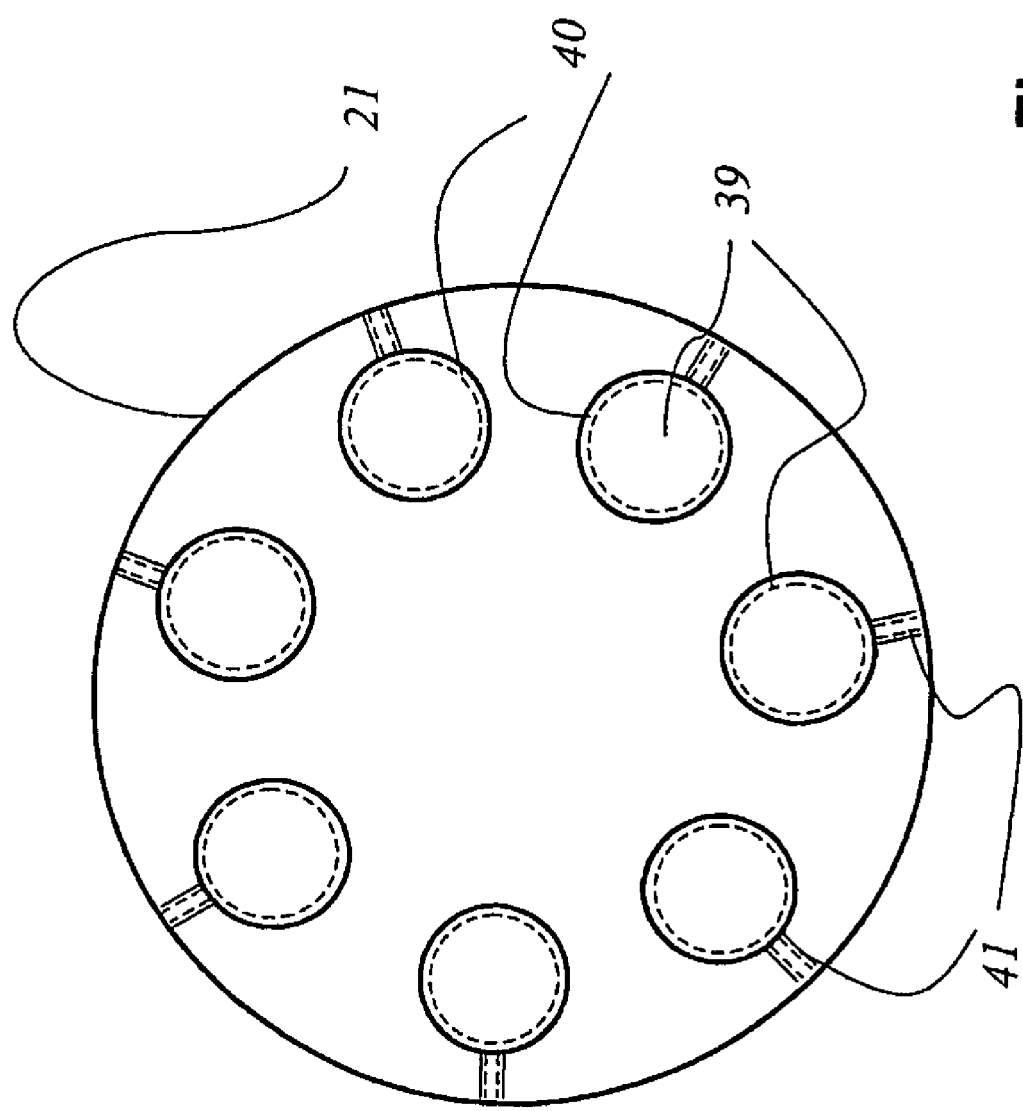
FIG. 2—a section through the lens turret of a microscope according to the invention.

FIG. 2 shows a section through the lens turret 21 of a microscope according to the invention. A plurality of lens holders 39 can be seen in the lens turret 21, whereby each lens holder 39 has a thread 40 into which a conventional lens 23 or a dummy can be screwed. Here, each lens holder 39 is additionally provided with a thread 41 for a locking screw.

FIG. 3 shows a locking device according to the invention. FIG. 3a depicts a locking device according to the invention prior to the locking (unlocked state). An enlarged section of the lens turret 21 can be seen with a lens holder 39 and with the thread 40 into which the lens 23 can be screwed. Moreover, the thread 41 for placing a locking screw is shown. Matching the thread 41, there is a screw 45 configured as a stud. This is a specially designed stud that can only be screwed into and out of the thread 41 with a special tool 47 that has a special screw head 49. Furthermore, the lens holder 39 has a clamp 43 designed as a leaf spring.

FIG. 3b illustrates how the locking mechanism works (locked state). After the screw 45 has been inserted and carefully screwed into the thread 41 using the special tool 47, the clamp is actuated. This causes a threaded leaf spring to be pressed against the outer thread of the lens. In this context, the screw 45 and the clamp 43 have to be actuated in such a way as not to cause any damage to the outer thread of the lens. The locking device can be subsequently released only by means of the special tool 47.

Figure 4:
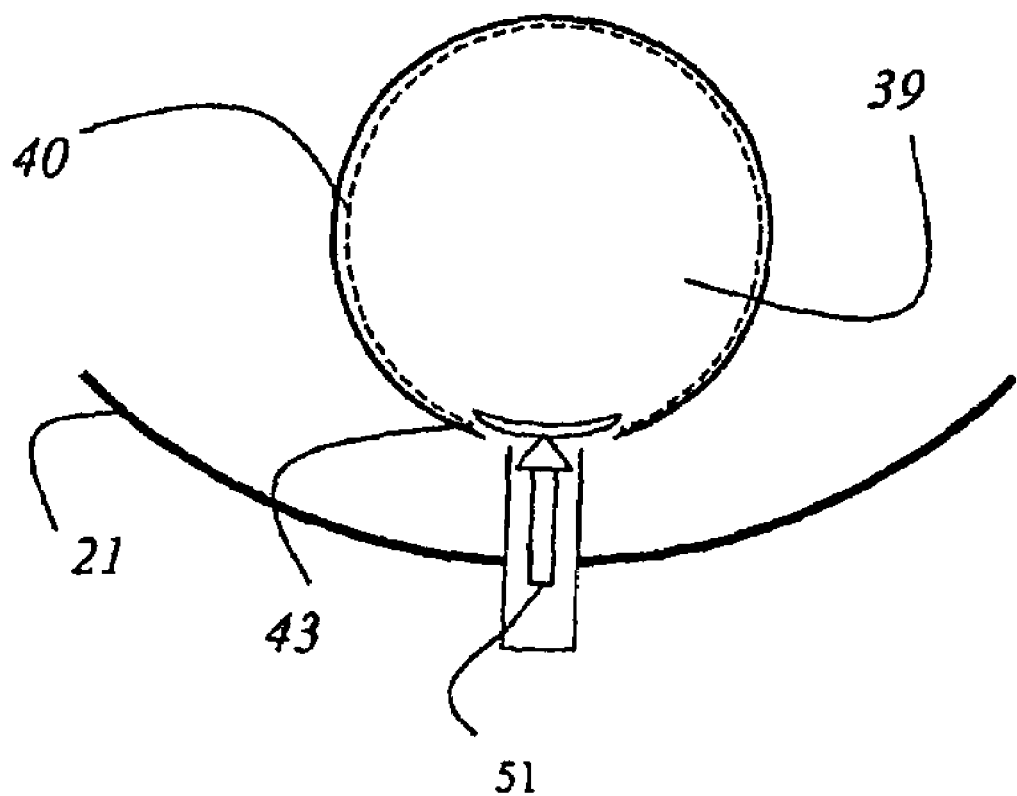
FIG. 4—a locking device according to the invention in a locked state.

FIG. 4 shows a locking device according to another embodiment of the invention in a locked state. In this embodiment a locking pin is provided in the form of moveable magnetic pin 51. As discussed above, after being screwed in, the lenses can be affixed in their holder by means of a respective moveable magnetic pin 51. After a special secret code has been entered, the locking device is released and the user can remove from the lens turret 21 the lens 23 that she/he has specified.

The invention was described with reference to an embodiment. Of course, changes and modifications can be made without departing from the scope of protection of the claims presented below.

1 light source
2 scanner
3 illumination light beam
5 illumination pinhole
7 beam splitter
9 scanning mirror
10 adjusting knob
11 specimen
13 specimen stage
15 detection light
17 detection pinhole
19 detector
21 lens turret
23 lens
25 microscope stand
26 control line
27 PC
29 monitor
31 panel box
33 knob
34 scale
35 keyboard
37 remote control
39 lens holder
40 thread
41 thread
43 clamp
45 screw
47 special tool
40 screw head
51

What is claimed is:

1. A microscope comprising:
   a lens holder configured to receive a lens; and
   a locking device configured to affix a lens received in the holder;
wherein the locking device includes a pin and an access control device configured to hinder unauthorized movement of the pin so as to block unauthorized removal of the lens from the lens holder.

2. The microscope as recited in claim 1 wherein the lens holder is configured to receive a plurality of lenses and wherein the locking device is configured to individually affix each of a plurality of lenses received in the holder so that the lenses cannot be removed without authorization.

3. The microscope as recited in claim 1 wherein the access control device includes a tool for moving the pin so as to permit removal of the lens from the lens holder.

4. The microscope as recited in claim 3 wherein the tool is a special tool.

5. The microscope as recited in claim 1 wherein the lens holder has a thread configured to threadably engage the lens and wherein the locking device is configured to prevent the lens from turning inside the thread when the lens is threadably engaged by the thread in a screwed-in position.

6. The microscope as recited in claim 1 wherein the pin includes a screw.

7. The microscope as recited in claim 6 wherein the screw includes a stud.

8. The microscope as recited in claim 5 wherein the locking device is configured to block the thread by a locking action.

9. The microscope as recited in claim 1 wherein the locking device includes a lock.

10. The microscope as recited in claim 1 wherein the locking device is configured to permit the lens to be removed after the lens is turned through a predefined turning movement including at least one of a clockwise and a counterclockwise turning movement by a predefined angle.

11. The microscope as recited in claim 10 further comprising a latch.

12. The microscope as recited in claim 1 wherein the microscope further comprises a light source configured to be automatically at least one of switched off, shielded and blocked by removing the lens.

13. The locking device as recited in claim 1 wherein the pin includes a moveable magnetic pin.

14. The locking device as recited in claim 1 wherein the access control device is a computing device configured to release the affixing device after entry of a secret code.

15. A locking device for a lens holder configured to receive a lens, the locking device comprising an affixing device configured to affix a lens received by the lens holder; wherein the affixing device includes a pin and an access control device configured to hinder unauthorized movement of the pin so as to block unauthorized removal of the lens from the lens holder.

16. The locking device as recited in claim 15 wherein the lens holder is configured to receive a plurality of lenses and wherein the affixing device is configured to individually affix each of a plurality of lenses received in the holder so that the lenses cannot be removed without authorization.

17. The locking device as recited in claim 15 wherein the access control device includes a tool for moving the pin so as to permit removal of the lens from the lens holder.

18. The locking device as recited in claim 17 wherein the tool is a special tool.

19. The locking device as recited in claim 15 wherein the lens holder includes a thread configured to threadably engage the lens and wherein the locking device is configured to prevent the lens from turning inside the thread when the lens is threadably engaged by the thread in a screwed-in position.

20. The locking device as recited in claim 15 wherein the pin includes a screw.

21. The locking device as recited in claim 20 wherein the screw includes a stud.

22. The locking device as recited in claim 19 wherein the affixing device is configured to block the thread by a locking action.

23. The locking device as recited in claim 15 further comprising a lock.

24. The locking device as recited in claim 15 wherein the locking device is configured to permit the lens to be removed after the lens is turned through a predefined turning movement including at least one of a clockwise and a counterclockwise turning movement by a predefined angle.

25. The locking device as recited in claim 24 further comprising a latch.

26. The locking device as recited in claim 15 wherein the access control device includes electronic circuitry configured to release the affixing device after entry of a secret code.

27. The locking device as recited in claim 15 wherein the access control device includes a coin receptacle configured to release the affixing device after insertion of a deposit coin therein.

28. The locking device as recited in claim 27 wherein the lens holder is configured to receive a plurality of lenses and wherein the affixing device is configured to individually affix each of a plurality of lenses received in the holder so that the lenses cannot be removed without authorization, and further comprising a respective coin receptacle for each lens.

29. The locking device as recited in claim 15 wherein the pin includes a moveable magnetic pin.

30. A microscope comprising:

a lens holder configured to receive a lens; and a locking device configured to affix a lens received in the holder so that the lens cannot be removed without authorization;

wherein the locking device is configured to permit the lens to be removed after the lens is turned through a predefined turning movement including at least one of a clockwise and a counterclockwise turning movement by a predefined angle.

* * * * *